(12) United States Patent
Tononishi

(10) Patent No.: US 10,388,916 B2
(45) Date of Patent: Aug. 20, 2019

(54) ENERGY STORAGE APPARATUS

(71) Applicant: GS Yuasa International Ltd., Kyoto-shi (JP)

(72) Inventor: Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 168 days.

(21) Appl. No.: 15/261,668

(22) Filed: Sep. 9, 2016

(65) Prior Publication Data

US 2017/0084884 A1   Mar. 23, 2017

(30) Foreign Application Priority Data

Sep. 18, 2015  (JP) ................. 2015-186042
Sep. 18, 2015  (JP) ................. 2015-186051

(51) Int. Cl.
| | | |
|---|---|---|
| H01M 10/42 | (2006.01) | |
| H01M 10/04 | (2006.01) | |
| H01M 2/04 | (2006.01) | |
| H01M 2/02 | (2006.01) | |
| H01M 2/36 | (2006.01) | |
| H01M 2/30 | (2006.01) | |
| H01M 2/10 | (2006.01) | |
| H01M 2/12 | (2006.01) | |

(52) U.S. Cl.
CPC ......... *H01M 2/0237* (2013.01); *H01M 2/043* (2013.01); *H01M 2/1094* (2013.01); *H01M 2/1252* (2013.01); *H01M 2/30* (2013.01); *H01M 2200/00* (2013.01)

(58) Field of Classification Search
None
See application file for complete search history.

(56) References Cited

U.S. PATENT DOCUMENTS

| | | | |
|---|---|---|---|
| 2005/0069759 A1 | 3/2005 | Shimamura et al. | |
| 2012/0021336 A1* | 1/2012 | Blunk ................. | H01M 8/0206 429/518 |
| 2013/0224539 A1* | 8/2013 | Hayashi .............. | H01M 2/1055 429/82 |
| 2013/0330576 A1* | 12/2013 | Kolden ............... | H01M 10/425 429/7 |
| 2014/0017533 A1 | 1/2014 | Nishihara et al. | |
| 2014/0017542 A1 | 1/2014 | Suzuki | |
| 2014/0205876 A1 | 7/2014 | Murata | |
| 2015/0072217 A1 | 3/2015 | Kim et al. | |
| 2015/0079449 A1 | 3/2015 | Kim et al. | |

(Continued)

FOREIGN PATENT DOCUMENTS

| | | |
|---|---|---|
| CA | 2595091 C | 1/2012 |
| JP | H07-251637 A | 10/1995 |

(Continued)

*Primary Examiner* — Yoshitoshi Takeuchi
(74) *Attorney, Agent, or Firm* — McGinn I.P. Law Group, PLLC.

(57) ABSTRACT

An energy storage apparatus including: an energy storage device; an outer covering; electric equipment disposed in the outer covering; and a housing part which houses the electric equipment, wherein a drain passage, which is disposed in a region covered by the electric equipment and through which water is discharged to outside of the region, is formed on a lower wall surface below the electric equipment in the housing part.

17 Claims, 10 Drawing Sheets

(56) References Cited

U.S. PATENT DOCUMENTS

| | | |
|---|---|---|
| 2015/0111083 A1 | 4/2015 | Kim et al. |
| 2015/0221911 A1 | 8/2015 | Kim et al. |
| 2015/0221922 A1 | 8/2015 | Kim et al. |
| 2016/0149177 A1 | 5/2016 | Sugeno et al. |
| 2016/0164147 A1 | 6/2016 | Suzuki |

FOREIGN PATENT DOCUMENTS

| | | |
|---|---|---|
| JP | 2003-229678 A | 8/2003 |
| JP | 2005-129487 A | 5/2005 |
| JP | 2006-344687 A | 12/2006 |
| JP | 2009-087646 A | 4/2009 |
| JP | 2010-170870 A | 8/2010 |
| JP | 2011-198713 A | 10/2011 |
| JP | 2011-229253 A | 11/2011 |
| JP | WO12/131809 A1 | 10/2012 |
| JP | 2012-212597 A | 11/2012 |
| JP | 2012-212599 A | 11/2012 |
| JP | 2013-038011 A | 2/2013 |
| JP | 2013-041708 A | 2/2013 |
| JP | 2013-089449 A | 5/2013 |
| JP | 2014-035970 A | 2/2014 |
| JP | 2014-150097 A | 8/2014 |
| JP | 2014-160677 A | 9/2014 |
| JP | 2014-165004 A | 9/2014 |
| JP | 2014-236571 A | 12/2014 |
| JP | 2015-011956 A | 1/2015 |
| JP | 2015-053144 A | 3/2015 |
| JP | 2016-504732 A | 2/2016 |
| JP | 2016-031890 A | 3/2016 |
| WO | WO 2006/090922 A1 | 8/2006 |

\* cited by examiner

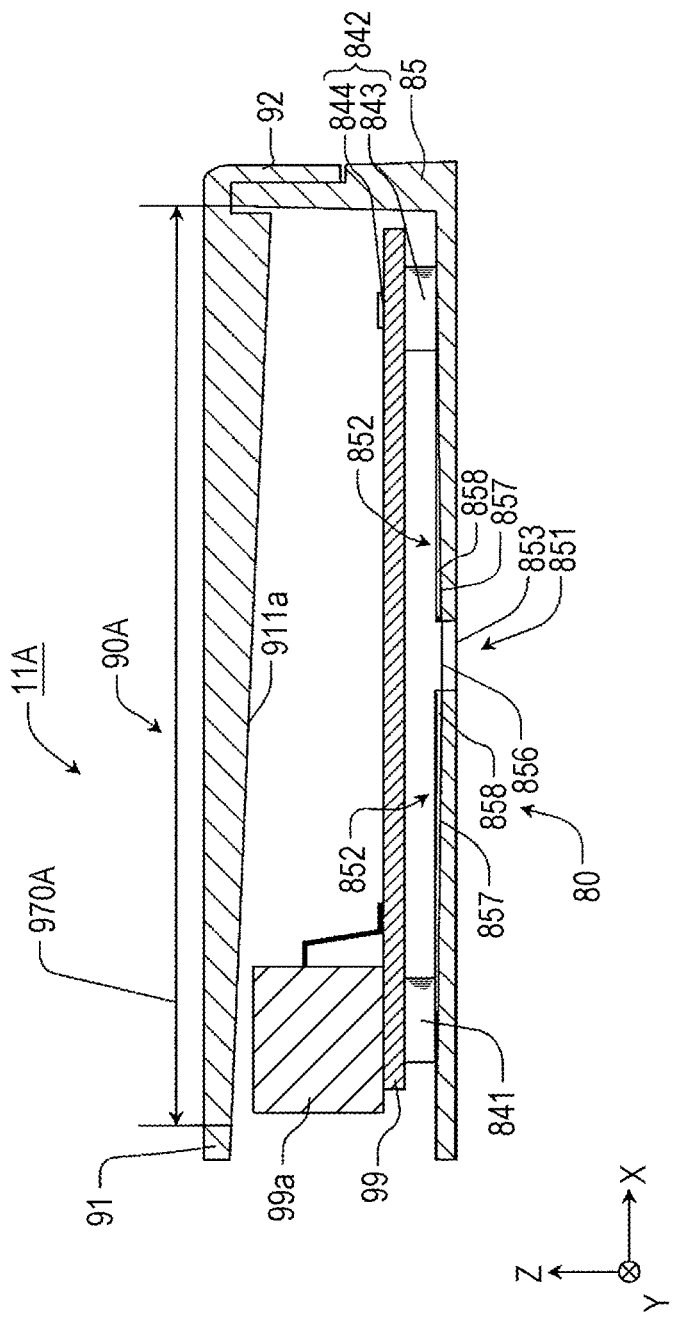

US 10,388,916 B2

ENERGY STORAGE APPARATUS

CROSS-REFERENCE TO RELATED APPLICATIONS

This application claims the benefit of Japanese patent applications No. 2015-186042, filed on Sep. 18, 2015, and No. 2015-186051, filed on Sep. 18, 2015, which are incorporated by reference.

FIELD

The present invention relates to an energy storage apparatus provided with an energy storage device and an outer covering.

BACKGROUND

Conventionally, there has been known an energy storage apparatus which houses a plurality of energy storage devices therein. In an outer covering, electric equipment such as a printed circuit board which performs an electric control of the energy storage apparatus is also housed (see JP-2015-11956A, for example).

During the use of an energy storage apparatus, due to a difference in temperature between the inside and outside of an outer covering, there may be a case where dew condensation occurs in the outer covering. In this case, there is a possibility that the condensed dew touches electric equipment and short-circuiting of the electric equipment occurs.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus which can suppress short-circuiting of electric equipment caused by condensed dew generated in an outer covering.

According to an aspect of the present invention, there is provided an energy storage apparatus which includes: an energy storage device; an outer covering; electric equipment disposed in the outer covering; and a housing part which houses the electric equipment, wherein a drain passage, which is disposed in a region covered by the electric equipment and through which water is discharged to outside of the region, is formed on a wall surface below the electric equipment in the housing part.

BRIEF DESCRIPTION OF DRAWINGS

The foregoing and other features of the present invention will become apparent from the following description and drawings of an illustrative embodiment of the invention in which:

FIG. 10 is a cross-sectional view of the outer covering.

DESCRIPTION OF EMBODIMENTS

Figure 1:
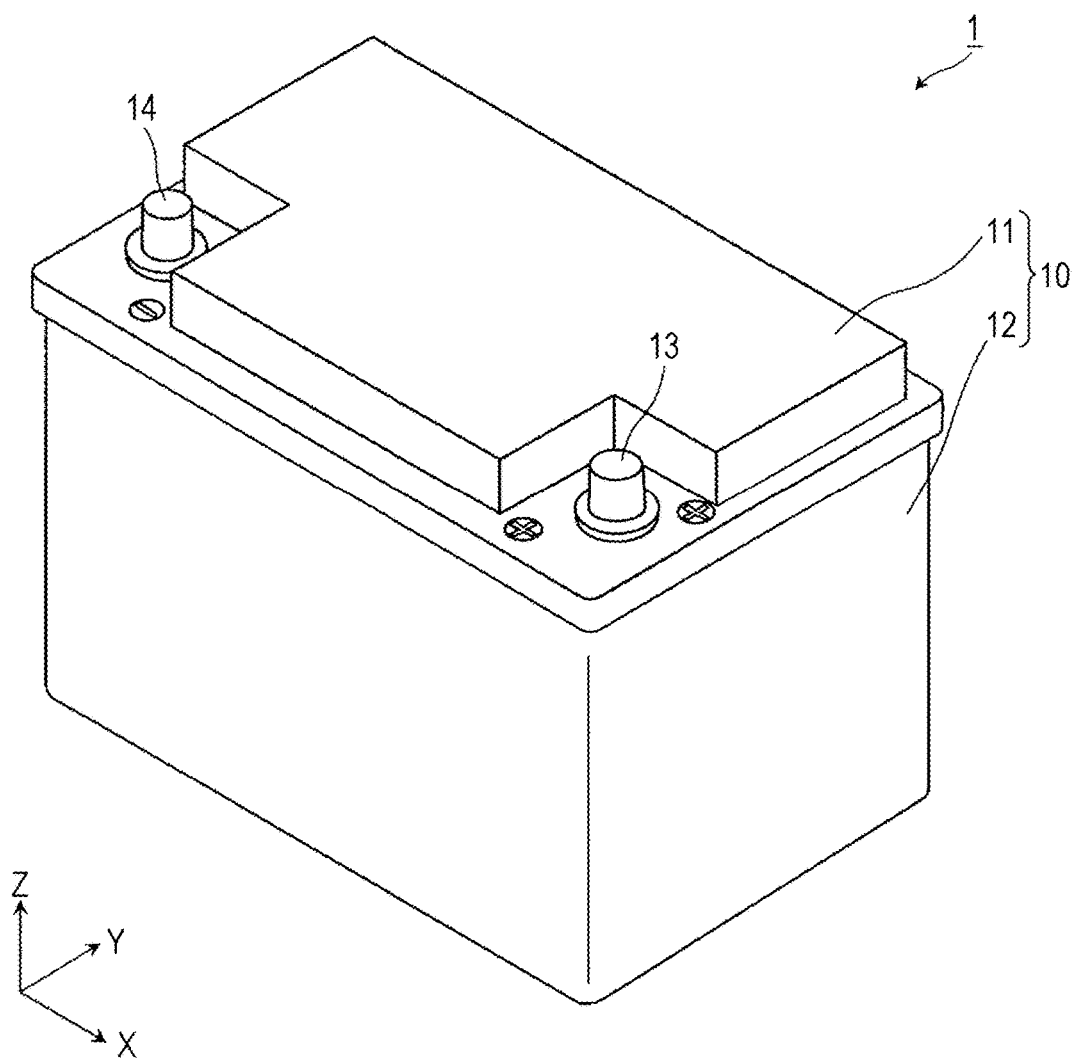
FIG. 1 is a perspective view showing an external appearance of an energy storage apparatus according to an embodiment of the present invention.

According to an aspect of the present invention, there is provided an energy storage apparatus which includes: an energy storage device; an outer covering; electric equipment disposed in the outer covering; and a housing part which houses the electric equipment, wherein a drain passage, which is disposed in a region covered by the electric equipment and through which water is discharged to outside of the region, is formed on a wall surface below the electric equipment in the housing part.

With such a configuration, the drain passage through which water is discharged to the outside of the region covered by the electric equipment is formed on the wall surface below the electric equipment in the housing part and hence, it is possible to suppress accumulation of condensed dew on a lower side of the electric equipment. Accordingly, it is possible to suppress short-circuiting of the electric equipment caused by dew condensation.

The drain passage may have a first inclined surface which is gradually lowered as the drain passage extends toward a drain port of the drain passage.

With such a configuration, the drain passage has the first inclined surface which is gradually lowered as the drain passage extends toward the drain port. Accordingly, drain water can be guided to the drain port by the first inclined surface with certainty.

A conductive member may be disposed at a position away from an area vertically below the drain port in a horizontal direction.

With such a configuration, the conductive member is disposed at the position away from the area vertically below the drain port in the horizontal direction and hence, drain water can be prevented from falling onto the conductive member. Accordingly, it is possible to prevent short-circuiting of the energy storage apparatus per se by drain water.

A second inclined surface, which is lowered as the second inclined surface extends toward the first inclined surface, may be formed in the region.

With such a configuration, the second inclined surface which is lowered as the second inclined surface extends toward the first inclined surface of the drain passage is formed in the region covered by the electric equipment. Accordingly, the dew condensation generated in the region can be guided to the first inclined surface by the second inclined surface.

An elongated projecting portion or a groove portion may be formed on the second inclined surface along an inclination direction.

With such a configuration, the elongated projecting portion is formed on the second inclined surface along the inclination direction. Accordingly, the condensed dew can be easily merged as liquid droplets and, at the same time, the liquid droplets can be guided to the first inclined surface by the projecting portion.

The electric equipment may be disposed in a spaced-apart manner from the wall surface.

With such a configuration, the electric equipment is disposed in a spaced-apart manner from the wall surface which is disposed below the electric equipment. Accordingly, it is possible to prevent the electric equipment from being brought into contact with the condensed dew generated on the wall surface.

The wall surface may be a hydrophobic surface.

With such a configuration, the wall surface disposed below the electric equipment is a hydrophobic surface. Accordingly, it is possible to accelerate the flow of condensed dew generated on the wall surface.

According to one aspect of the present invention, there is provided an energy storage apparatus which includes: an energy storage device; an outer covering; electric equipment disposed in the outer covering; and a housing part which houses the electric equipment, wherein a first inclined portion which is disposed in a region which covers the electric equipment and is disposed closer to the electric equipment as the first inclined portion approaches an edge of the region is formed on an upper wall surface of the housing part above the electric equipment.

With such a configuration, the first inclined portion which is disposed closer to the electric equipment as the first inclined portion approaches the edge of the region is formed on the region of an upper wall surface of the housing part which covers the electric equipment. Accordingly, it is possible to guide the condensed dew to a desired position using the first inclined portion as a guide. Accordingly, it is possible to suppress falling of condensed dew on the electric equipment and hence, short-circuiting of the electric equipment can be suppressed.

The first inclined portion is continuously formed from the region to an outer region disposed adjacently to the region, and an outer region side of the first inclined portion may be set lower than a region side of the first inclined portion.

With such a configuration, the first inclined portion is continuously formed to the outer region and hence, it is possible to guide the condensed dew to the outside of the electric equipment. Accordingly, it is possible to suppress falling of condensed dew on the electric equipment more effectively.

The first inclined portion is a projecting portion which projects toward an electric equipment side from the upper wall surface, and the projecting portion may be formed in an elongated manner along the upper wall surface.

With such a configuration, the first inclined portion is formed of the elongated projecting portion. Accordingly, compared to a case where the upper wall surface is simply inclined, condensed dew is minimally fallen and hence, condensed dew can be easily merged as liquid droplets.

The first inclined portion may be formed of a plurality of first inclined portions which are disposed at intervals.

With such a configuration, the plurality of first inclined portions are disposed at intervals. Accordingly, the condensed dew can be guided in a wide range.

A second inclined portion which is disposed closer to the electric equipment as the second inclined portion extends toward the first inclined portion may be formed on the upper wall surface.

With such a configuration, the second inclined portion which is disposed closer to the electric equipment as the second inclined portion extends toward the first inclined portion is formed on the upper wall surface. Accordingly, the condensed dew can be guided to the first inclined portion by the second inclined portion. Therefore, the condensed dew can be easily guided to the first inclined portion.

The first inclined portion may be formed of an inclined surface formed by inclining at least a portion of the upper wall surface.

With such a configuration, the first inclined surface is formed of the inclined surface. Accordingly, it is possible to guide the condensed dew to a desired position with the simple configuration.

The upper wall surface may be a hydrophilic surface.

With such a configuration, the upper wall surface is a hydrophilic surface. Accordingly, it is possible to suppress falling of the condensed dew generated on the upper wall surface.

According to the energy storage apparatus of the present invention, it is possible to suppress the short-circuiting of the electric equipment caused by condensed dew which is generated in the outer covering.

Hereinafter, an energy storage apparatus according to an embodiment of the present invention is described with reference to drawings. The embodiment described hereinafter is one preferred specific example of the present invention. In the embodiment described hereinafter, numerical values, shapes, materials, constitutional elements, the arrangement positions and connection states of the constitutional elements and the like are merely examples, and these are not intended to limit the present invention. Further, out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

Embodiment

First, a configuration of an energy storage apparatus 1 is described.

Figure 2:
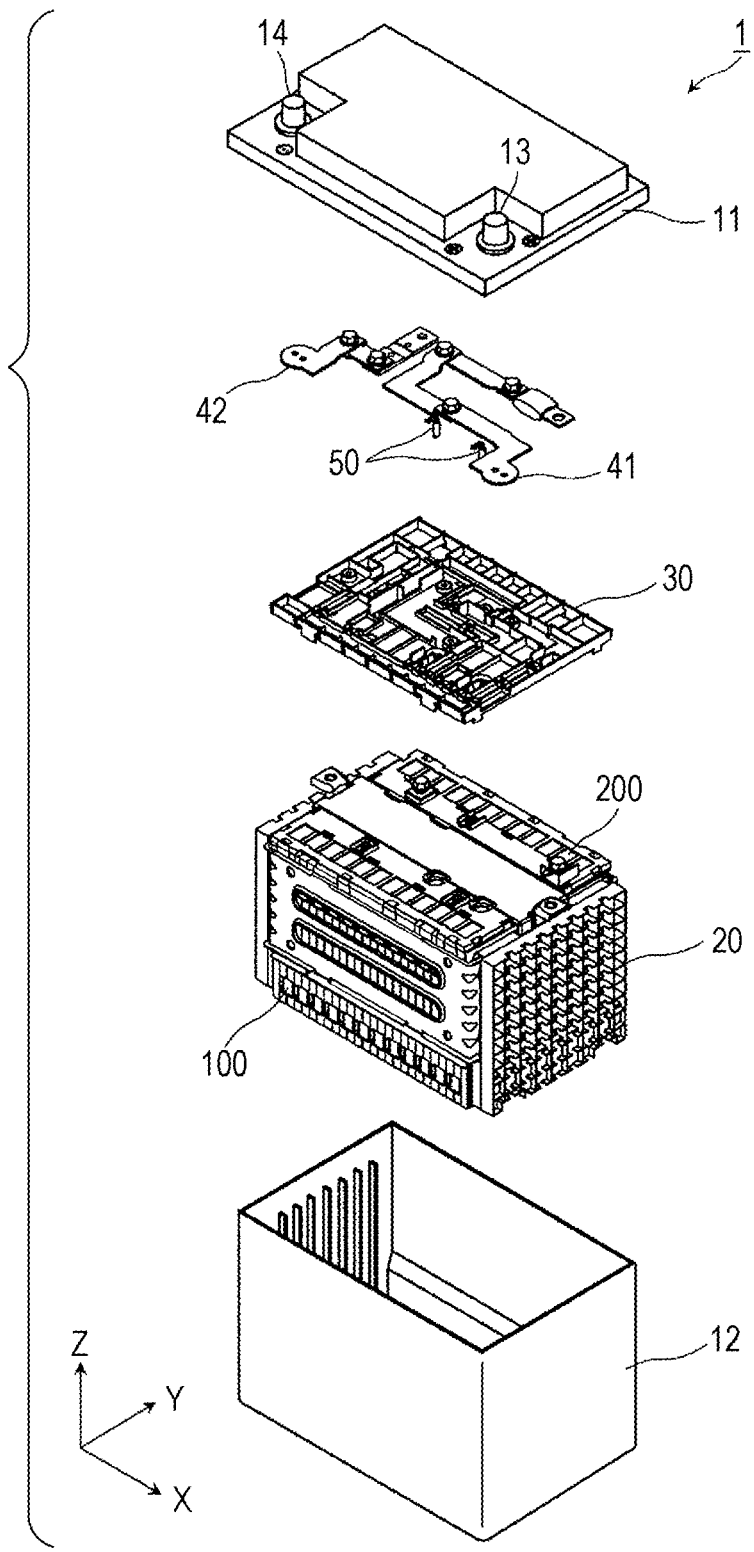
FIG. 2 is an exploded perspective view showing constitutional elements of the energy storage apparatus.

FIG. 1 is a perspective view showing an external appearance of an energy storage apparatus 1 according to an embodiment of the present invention. FIG. 2 is an exploded perspective view showing constitutional elements of the energy storage apparatus 1.

In these drawings, the Z axis direction is indicated as the vertical direction, and the description is made hereinafter using the Z axis direction as the vertical direction. However, there may be also a case where the Z axis direction is not the vertical direction depending on a mode of use. Accordingly, the Z axis direction is not limited to the vertical direction. The same goes for drawings which are referenced hereinafter.

The energy storage apparatus 1 is an apparatus which can charge electricity from the outside of the energy storage apparatus 1 therein or can discharge electricity to the outside of the energy storage apparatus 1. For example, the energy storage apparatus 1 may be a battery module used for power storage application, power source application or the like. It is preferable that the energy storage apparatus 1 according to this embodiment be used as a starting battery for a mobile body such as an automobile or a two-wheeled vehicle. There may be a case where the energy storage apparatus 1 is installed in a hood of a mobile body or in a trunk in a state where an outer covering 10 is exposed to the outside. The energy storage apparatus 1 may be used in a single form (single body) without being connected with other energy storage apparatus (battery module). For example, with respect to a mobile body (truck or the like) which requires a large power consumption at the time of starting, there may be a case where a plurality of energy storage apparatuses 1 are connected to each other in series. In this case, the plurality of energy storage apparatuses 1 are not used in an integrated manner but used in a single form (single body) respectively. That is, the energy storage apparatus 1 of this embodiment may differ from a so-called battery pack where a plurality of energy storage apparatuses are housed in a case and are integrated with each other.

As shown in FIG. 1 and FIG. 2, the energy storage apparatus 1 includes: an outer covering 10 formed of a first outer covering 11 and a second outer covering 12; and an energy storage unit 20, a holder 30, bus bars 41, 42, thermistors 50 and the like which are housed in the outer covering 10.

The outer covering 10 is a container (module case) having a rectangular shape (box shape) which forms an outer covering of the energy storage apparatus 1. Only a part of the outer covering 10 is communicated with the outside so that the energy storage apparatus 1 is used substantially in a sealed state (almost in a sealed state). The outer covering 10 is disposed outside the energy storage unit 20, the holder 30, the bus bars 41, 42 and the thermistors 50 and allows the energy storage unit 20 and the like to be disposed at predetermined positions in the outer covering 10 thus protecting the energy storage unit 20 and the like from an impact or the like. For example, the outer covering 10 is made of an insulating resin material such as polycarbonate (PC), polypropylene (PP), polyethylene (PE), a polyphenylene sulfide resin (PPS), polybutylene terephthalate (PBT) or an ABS resin. The outer covering 10 prevents the energy storage unit 20 and the like from coming into contact with a metal member or the like disposed outside the outer covering 10.

The outer covering 10 includes: the first outer covering 11 forming a lid body of the outer covering 10; and the second outer covering 12 forming a body of the outer covering 10. The first outer covering 11 is a cover member having a flat rectangular shape which closes an opening of the second outer covering 12. A positive electrode external terminal 13 and a negative electrode external terminal 14 are mounted on the first outer covering 11. The energy storage apparatus 1 charges electricity from the outside therein or discharges electricity to the outside through the positive electrode external terminal 13 and the negative electrode external terminal 14. The second outer covering 12 is a bottomed rectangular cylindrical case having the opening. The second outer covering 12 houses the energy storage unit 20, the holder 30, the bus bars 41, 42, the thermistors 50 and the like.

The first outer covering 11 and the second outer covering 12 may be made of the same material, or may be made of different materials.

The detailed configuration of the first outer covering 11 is described later.

The energy storage unit 20 includes a plurality of energy storage devices 100 (twelve energy storage devices 100 in this embodiment) and a plurality of bus bars 200, and is electrically connected to the positive electrode external terminal 13 and the negative electrode external terminal 14 formed on the first outer covering 11. A positive electrode terminal of any one of the plurality of energy storage devices 100 is electrically connected to the positive electrode external terminal 13 through the bus bar 200. A negative electrode terminal of any one of the plurality of energy storage devices 100 is electrically connected to the negative electrode external terminal 14 through the bus bar 200.

The energy storage unit 20 is disposed in the second outer covering 12 such that the plurality of energy storage devices 100 are arranged in a row in the X axis direction in a state where each energy storage device 100 is mounted vertically (in a state where a positive electrode terminal and a negative electrode terminal are directed upward). The energy storage unit 20 is housed in the outer covering 10 while being covered by the first outer covering 11 from above. The detailed description of the configuration of the energy storage unit 20 is made later.

The holder 30 is a member which holds the bus bars 41, 42, can provide insulation between the bus bars 41, 42 and other members, and can perform positional regulation of the bus bars 41, 42. The holder 30 positions the bus bars 41, 42 with respect to the bus bars 200 in the energy storage unit 20, and the positive electrode external terminal 13 and the negative electrode external terminal 14.

The holder 30 is disposed on an upper side of the energy storage unit 20 (a plus side in the Z axis direction), and is positioned with respect to the energy storage unit 20. The holder 30 is positioned by disposing the bus bars 41, 42 on the holder 30. The first outer covering 11 is disposed on the holder 30. With such a configuration, the bus bars 41, 42 are positioned with respect to the bus bars 200 disposed in the energy storage unit 20, and the positive electrode external terminal 13 and the negative electrode external terminal 14 which are mounted on the first outer covering 11.

The holder 30 also has a function of holding the thermistors 50. That is, by mounting the thermistors 50 on the holder 30, the thermistors 50 are positioned with respect to the energy storage devices 100, and are fixed in a state where the thermistors 50 are pressed to the energy storage devices 100.

Although the holder 30 is made of an insulating resin material such as PC, PP, PE, PPS, PBT or an ABS resin, the holder 30 may be made of any material as long as a material has an insulating property.

The bus bars 41, 42 electrically connect the bus bars 200 in the energy storage unit 20 and the positive electrode external terminal 13 and the negative electrode external terminal 14 mounted on the first outer covering 11 to each other. That is, the bus bar 41 is a conductive member which electrically connects the bus bars 200 disposed on one end in the energy storage unit 20 and the positive electrode external terminal 13 to each other, and the bus bar 42 is a conductive member which electrically connects the bus bars 200 disposed on the other end in the energy storage unit 20 and the negative electrode external terminal 14 to each other.

The bus bars 41, 42 are made of copper, for example, as conductive members. However, a material for forming the bus bars 41, 42 is not particularly limited. The bus bars 41, 42 may be made of the same material, or may be made of different materials.

The thermistors 50 are temperature sensors mounted on the holder 30 with respect to the energy storage devices 100. The thermistors 50 are fixed to the energy storage devices 100, and measure temperatures of the energy storage devices 100. In this embodiment, two thermistors 50 are disposed with respect to two energy storage devices 100.

Next, the configuration of the energy storage unit 20 is described in detail.

Figure 3:
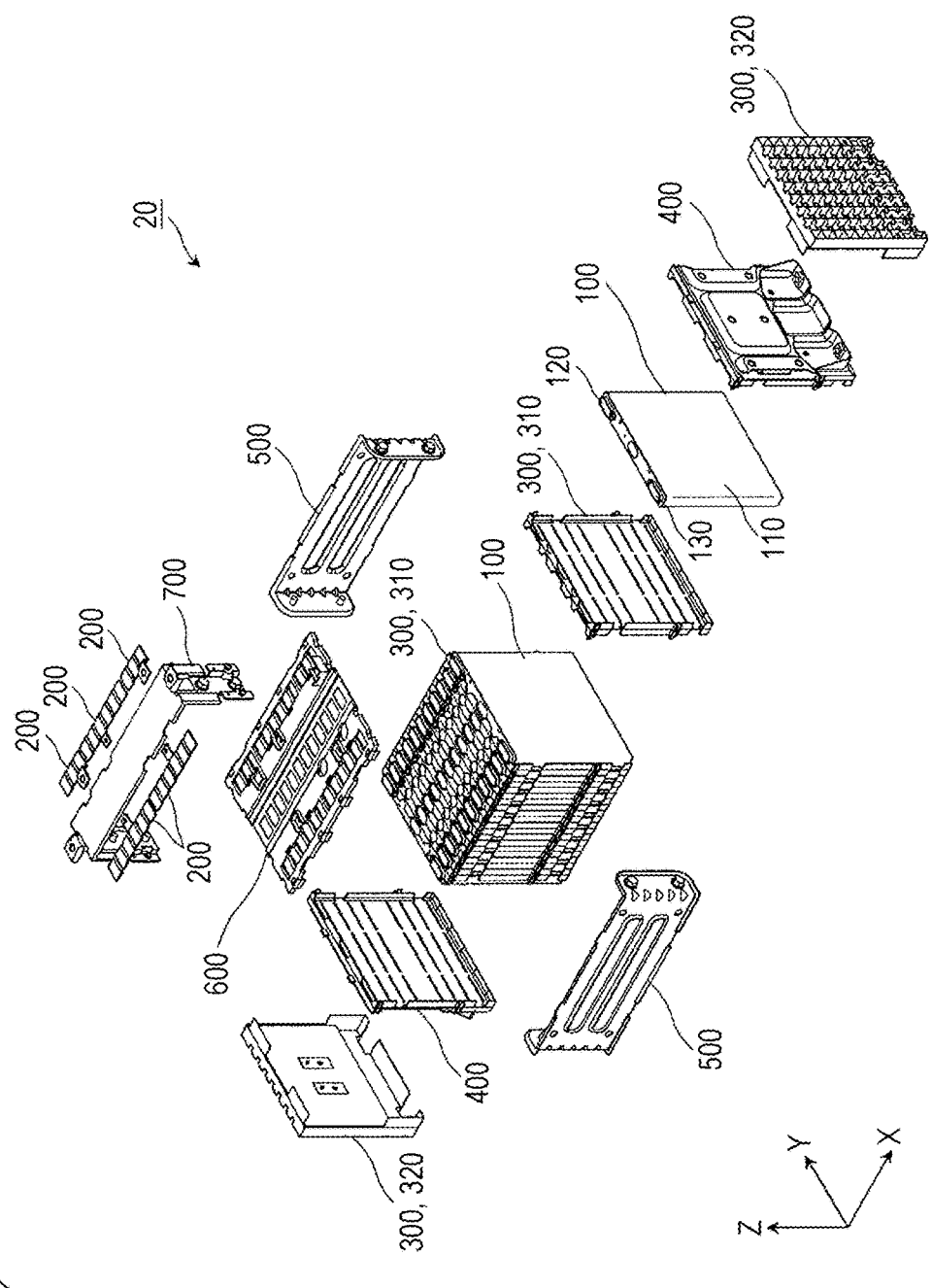
FIG. 3 is an exploded perspective view showing constitutional elements of an energy storage unit.

FIG. 3 is an exploded perspective view showing constitutional elements of the energy storage unit 20.

As shown in FIG. 3, the energy storage unit 20 includes: the plurality of energy storage devices 100; the plurality of bus bars 200; a plurality of spacers 300 (a plurality of spacers 310 and a pair of spacers 320); a pair of sandwiching members 400; a plurality of binding members 500; a bus bar frame 600; and a heat insulating plate 700.

The energy storage device 100 is a secondary battery (battery) which can charge or discharge electricity. To be more specific, the energy storage device 100 is a nonaqueous electrolyte secondary battery such as a lithium ion secondary battery. The energy storage device 100 has a flat rectangular shape, and is disposed adjacently to the spacer 310. That is, the plurality of energy storage devices 100 and the plurality of respective spacers 310 are arranged in a row in the X axis direction such that the energy storage device 100 and the spacer 310 are alternately arranged. In this embodiment, twelve energy storage devices 100 and eleven spacers 310 are arranged such that the energy storage device 100 and the spacer 310 are alternately arranged. The energy storage device 100 is not limited to a nonaqueous electrolyte secondary battery, and may be a secondary battery other than a nonaqueous electrolyte secondary battery, or may be a capacitor.

The energy storage device 100 includes a container 110, a positive electrode terminal 120 and a negative electrode terminal 130. An electrode assembly (power generating element), current collectors (a positive electrode current collector and a negative electrode current collector) and the like are disposed in the container 110, and a liquid such as an electrolyte solution (non-aqueous electrolyte) is sealed in the container 110. However, the detailed description of such a configuration is omitted.

The container 110 is formed of a bottomed container body made of metal and having a rectangular cylindrical shape; and a metal-made lid portion which closes an opening of the container body. The container 110 is configured such that the inside of the container 110 can be hermetically sealed by joining the lid portion and the container body to each other by welding or the like after the electrode assembly and the like are housed in the container 110. The container 110 is a rectangular parallelepiped container having a lid portion disposed on a plus side in the Z axis direction, long side surfaces disposed on side surfaces of the container on both sides in the X axis direction, short side surfaces disposed on side surfaces of the container on both sides in the Y axis direction, and a bottom surface disposed on a minus side in the Z axis direction. Although a material for forming the container 110 is not particularly limited, it is preferable that the container 110 be made of weldable metal such as stainless steel, aluminum or an aluminum alloy.

The positive electrode terminal 120 is an electrode terminal electrically connected to a positive electrode of an electrode assembly through a positive electrode current collector. The negative electrode terminal 130 is an electrode terminal electrically connected to a negative electrode of an electrode assembly through a negative electrode current collector. Both the positive electrode terminal 120 and the negative electrode terminal 130 are mounted on the lid portion of the container 110. The positive electrode terminal 120 and the negative electrode terminal 130 are metal-made electrode terminals through which electricity stored in the electrode assembly is discharged to a space outside the energy storage device 100, and through which electricity is introduced into a space inside the energy storage device 100 for storing the electricity in the electrode assembly. In this embodiment, the energy storage devices 100 are disposed in a state where the positive electrode terminals 120 and the negative electrode terminals 130 are directed upward.

The bus bars 200 are bus bars which are electrically connected to the plurality of respective energy storage devices 100 housed in the energy storage unit 20. That is, the bus bars 200 are conductive members electrically connected to the respective electrode terminals which the plurality of energy storage devices 100 include. The bus bars 200 electrically connect either one of positive and negative electrode terminals of one energy storage device 100 to the corresponding electrode terminal of another energy storage device 100 disposed adjacently to one energy storage device. The bus bars 200 are disposed on surfaces of the respective electrode terminals which the plurality of energy storage devices 100 include, and are connected (joined) to the electrode terminals.

In this embodiment, five bus bars 200 are disposed. Twelve energy storage devices 100 are configured such that four sets of energy storage devices 100 each of which is formed by connecting three energy storage devices 100 in parallel to each other are connected in series by five bus bars 200. The bus bars 200 disposed at end portions of the energy storage unit 20 are connected to the above-mentioned bus bars 41, 42 respectively. With such a configuration, the energy storage devices 100 are electrically connected to the positive electrode external terminal 13 and the negative electrode external terminal 14.

The bus bars 200 are made of aluminum, for example, as conductive members. However, a material for forming the bus bar 200 is not particularly limited. All bus bars 200 may be made of the same material, or some of the bus bars 200 may be made of different materials.

The spacers 300 are formed of the plurality of spacers 310 and the pair of spacers 320, and are made of an insulating resin such as PC, PP, PE, PPS, PBT or an ABS resin. The spacers 310 and 320 may be made of any material as long as the material has an insulating property and, further, all of spacers 310 and 320 may be made of the same material, or some of the spacers 310 and 320 may be made of different materials respectively.

The spacer 310 is a plate-like member which is disposed on a side of the energy storage device 100 (on the plus side or the minus side in the X axis direction) so as to provide insulation between the energy storage device 100 and other members. The spacer 310 is arranged between two energy storage devices 100 adjacent to each other so as to provide insulation between two energy storage devices 100. In this embodiment, twelve energy storage devices 100 and eleven spacers 310 are arranged in a row such that the spacer 310 is disposed between two energy storage devices 100 adjacent to each other.

The spacer 310 is formed to cover an approximately half of a front surface side or a back surface side of the energy storage device 100 (an approximately half of the front surface side or the back surface side when the energy storage device 100 is divided in two in the X axis direction). That is, a recessed portion is formed on both the front surface side and the back surface side (both surfaces in the X axis direction) respectively, and an approximately half of the energy storage device 100 is inserted into each recessed portion. With such a configuration, the spacers 310 disposed on sides of the energy storage device 100 cover the most part of the energy storage device 100. Accordingly, an insulating property between the energy storage devices 100 and other conductive members can be enhanced by the spacers 310.

The spacer 320 is a plate-like member which is disposed between the sandwiching member 400 described later and the outer covering 10, and provides insulation between the sandwiching member 400 and the outer covering 10. The spacer 320 also has a function as a buffer member which protects the energy storage unit 20 when an impact is applied to the outer covering 10 from the outside. The pair of spacers 320 is disposed between the pair of sandwiching members 400 and the outer covering 10 respectively such that the pair of spacers 320 sandwiches the pair of sandwiching members 400 from both sides. The pair of spacers 320 insulates the energy storage devices 100 and the like disposed in the energy storage unit 20 and also protects the energy storage devices 100 and the like from an impact from the outside.

The sandwiching members 400 and the binding members 500 are members which press the energy storage devices 100 from the outside in the stacking direction of the electrode assembly of the energy storage device 100. The sandwiching members 400 and the binding members 500 sandwich the plurality of energy storage devices 100 from both sides in the stacking direction thus pressing each energy storage device 100 included in the plurality of respective energy storage devices 100 from both sides. The stacking direction of the electrode assembly of the energy storage devices 100 means the direction that positive electrodes, negative electrodes and separators of the electrode assembly are stacked, and is equal to the direction (X axis direction) that the plurality of energy storage devices 100 are arranged in a row. The plurality of energy storage devices 100 are arranged in a row in the stacking direction.

The sandwiching members 400 are flat plate-like members (end plates) disposed on both sides of a unit formed of the plurality of energy storage devices 100 in the X axis direction. The sandwiching members 400 hold the plurality of energy storage devices 100 and the plurality of spacers 310 by sandwiching the unit formed of the plurality of energy storage devices 100 and the plurality of spacers 310 from both sides in the arrangement direction (X axis direction) of the plurality of energy storage devices 100 and the plurality of spacers 310. From a viewpoint of strength, the sandwiching members 400 are respectively formed of a member made of metal (conductive) such as stainless steel or aluminum. However, the material for forming the sandwiching members 400 is not limited to such metal materials, and the sandwiching members 400 may be formed of an insulating member having high strength, for example.

The binding member 500 is an elongated flat-plate-like member (binding bar) which has both ends thereof mounted on the sandwiching members 400, and binds the plurality of energy storage devices 100 to each other. The binding member 500 is disposed so as to straddle over the plurality of energy storage devices 100 and the plurality of spacers 310 thus applying a binding force to the plurality of energy storage devices 100 and plurality of spacers 310 in the arrangement direction (X axis direction) thereof.

In this embodiment, two binding members 500 are disposed on both sides (both sides in the Y axis direction) of the unit formed of the plurality of energy storage devices 100, and two binding members 500 bind the plurality of energy storage devices 100 to each other by sandwiching the plurality of energy storage devices 100 from both sides. In the same manner as the sandwiching members 400, the binding members 500 are preferably made of metal such as stainless steel or aluminum. However, the binding members 500 may be made of a material other than metal.

The bus bar frame 600 is a member which can provide insulation between the bus bars 200 and other members, and can regulate the positions of the bus bars 200. Particularly, the bus bar frame 600 performs the positioning of the bus bars 200 with respect to the plurality of energy storage devices 100 disposed in the energy storage unit 20.

The bus bar frame 600 is disposed on an upper side of the plurality of energy storage devices 100 (a plus side in the Z axis direction), and is positioned with respect to the plurality of energy storage devices 100. The bus bars 200 are placed on an upper side of the bus bar frame 600 and are positioned. With such a configuration, the bus bars 200 are positioned with respect to the plurality of energy storage devices 100, and are joined to electrode terminals which the plurality of energy storage devices 100 respectively include. Although the bus bar frame 600 is made of an insulating resin material such as PC, PP, PE, PPS, PBT or an ABS resin, for example, the bus bar frame 600 may be made of any material as long as the material has an insulating property.

The heat insulating plate 700 is a plate-like member having a heat insulating property which is disposed in a flow passage of an exhaust discharged from safety valves of the energy storage devices 100. To be more specific, the heat insulating plate 700 is disposed above the bus bar frame 600 to be positioned above the safety valves of the energy storage devices 100. When an abnormal state occurs such as a case where a gas is discharged from the safety valve of the energy storage device 100, the heat insulating plate 700 protects electric equipment such as a printed circuit board disposed above the energy storage unit 20 from heat of the gas. In this embodiment, the heat insulating plate 700 is made of a metal material having low thermal conductivity such as stainless steel. However, a material for forming the heat insulating plate 700 is not limited to such a metal material, and the heat insulating material 700 may be made of a resin such as PPS or PBT which is reinforced by glass fibers or ceramics, for example, as long as the material has a high heat resistance and a low thermal conductivity.

In the energy storage apparatus 1 having the above-mentioned configuration, the configuration of the first outer covering 11 is described in detail.

Figure 4:
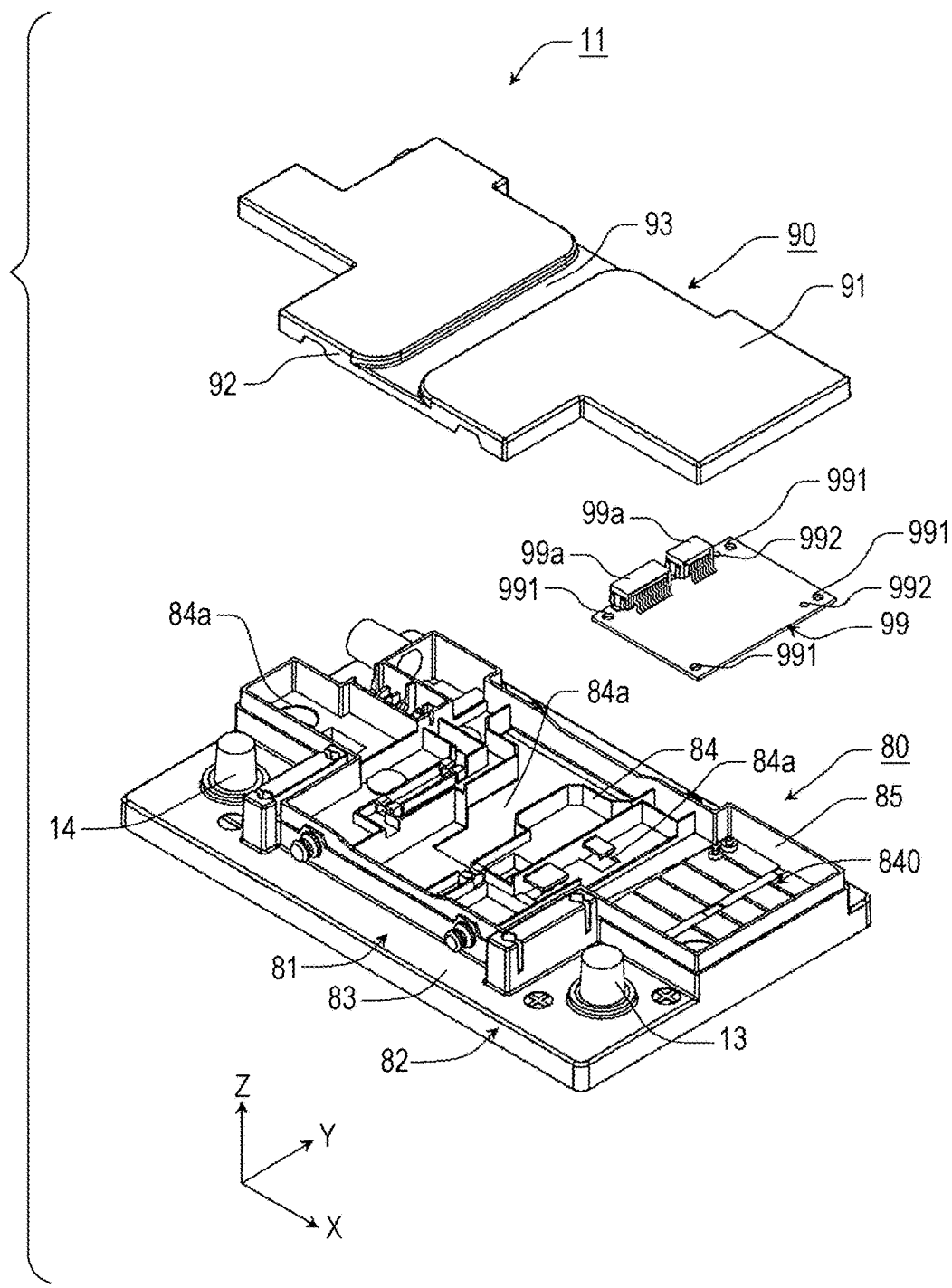
FIG. 4 is an exploded perspective view showing a schematic configuration of a first outer covering.

FIG. 4 is an exploded perspective view showing a schematic configuration of the first outer covering 11. In FIG. 1 and FIG. 2, the first outer covering 11 is schematically shown. However, in FIG. 4, the first outer covering 11 is shown in more detail.

As shown in FIG. 4, the first outer covering 11 includes a lid body 80 and a cover body 90 in a separable manner. The lid body 80 closes an opening of the second outer covering 12, and the cover body 90 covers a portion of the lid body 80.

The lid body 80 is formed as an integral body using the above-mentioned insulating resin material, and includes a top plate portion 81 and an edge portion 82.

The top plate portion 81 is a portion facing the opening of the second outer covering 12. The top plate portion 81 includes an exposed portion 83 which is not covered by the cover body 90, and a covered portion 84 which is covered by the cover body 90.

The exposed portion 83 is formed into an approximately flat shape, and the positive electrode external terminal 13 and the negative electrode external terminal 14 are disposed on the exposed portion 83. A wall portion 85 is formed on the covered portion 84 in a standing manner at a boundary between the covered portion 84 and the exposed portion 83. Electric equipment such as a printed circuit board 99 and relays (not shown in the drawing), and wirings (not shown in the drawing) for connecting such electric equipment and the energy storage devices 100 in the energy storage unit 20 to each other are disposed in a region inside the wall portion 85. A plurality of openings 84*a* for guiding the wirings toward the second outer covering 12 side are formed in a bottom portion of the covered portion 84.

On the printed circuit board 99, a control circuit is mounted. The control circuit acquires, monitors and controls various kinds of information such as a charging state and a discharging state of the energy storage devices 100, a voltage value, a current value, and a temperature of the energy storage device 100. Further, the control circuit controls ON and OFF of the relays and performs communication with other equipment. In FIG. 4, only a connector 99*a* which is a part of the control circuit is shown.

Various kinds of electric equipment disposed on an inner side of the covered portion 84 are covered by the cover body 90 and hence, such electric equipment are protected from an impact or the like and, at the same time, it is possible to prevent the electric equipment from coming into contact with external metal members and the like.

In the covered portion 84, assume a region where the printed circuit board 99 is disposed as a circuit board installation region 840. The circuit board installation region 840 is disposed on one end portion of the covered portion 84 on a plus side in the X axis direction. The printed circuit board 99 is disposed in the circuit board installation region 840 in a horizontal state (in parallel to the XY plane), and is housed in the first outer covering 11 by being covered by the cover body 90. That is, the first outer covering 11 is a housing part which houses the printed circuit board 99 therein.

The circuit board installation region 840 adopts the drain structure. However, the detail of the drain structure is described later.

The edge portion 82 extends downward from a peripheral edge of the top plate portion 81 over the whole circumference of the top plate portion 81, and overlaps with a peripheral edge of the opening of the second outer covering 12 from the outside. A portion where the edge portion 82 and the second outer covering 12 are made to overlap with each other adopts the well-known watertight structure so that it is possible to prevent the intrusion of water into the second outer covering 12 from the outside.

Figure 5:
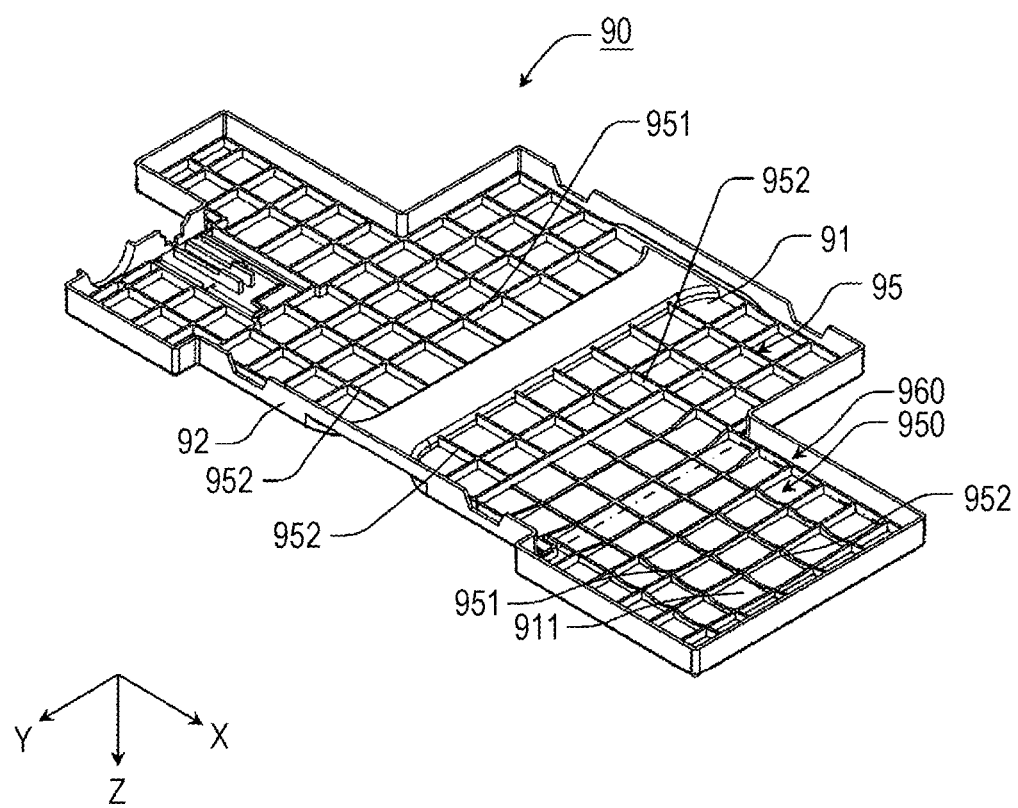
FIG. 5 is a perspective view showing a schematic configuration of a cover body as viewed from below.

FIG. 5 is a perspective view showing the schematic configuration of the cover body 90 as viewed from below.

As shown in FIG. 4 and FIG. 5, the cover body 90 is formed as an integral body using the above-mentioned insulating resin material. The cover body 90 has a shape which corresponds to an outer shape of the covered portion 84 as viewed in a top plan view, and includes the top plate portion 91 and the edge portion 92.

The top plate portion 91 is a portion which faces the covered portion 84 of the lid body 80. A recessed portion 93 which extends along the Y axis direction is formed on the center of an upper surface of the top plate portion 91, and portions of the upper surface of the top plate portion 91 other than the recessed portion 93 are formed into an approximately flat shape.

As shown in FIG. 5, on a lower surface of the top plate portion 91 other than the recessed portion 93, a grid portion 95 which projects downward in a grid array is formed. In a facing region 950 which faces the circuit board installation region 840 and an outer region 960 which is disposed adjacently to the facing region 95 on the lower surface of the top plate portion 91, the condensation countermeasure structure is adopted by the grid portion 95 which corresponds to such regions. The detailed condensation countermeasure structure is described later. Assume a portion of the lower surface of the top plate portion 91 which covers the printed circuit board 99 disposed in the circuit board installation region 840 from above as an upper wall surface 911.

The edge portion 92 extends downward from a peripheral edge of the top plate portion 91 over the whole circumference thereof, and overlaps with the wall portion 85 of the lid body 80 from the outside. A portion where the edge portion 92 and the wall portion 85 of the lid body 80 are made to overlap with each other adopts the well-known watertight structure so that it is possible to prevent the intrusion of water into the covered portion 84 from the outside.

Next, the drain structure provided to the circuit board installation region 840 of the lid body 80 is described.

Figure 6:
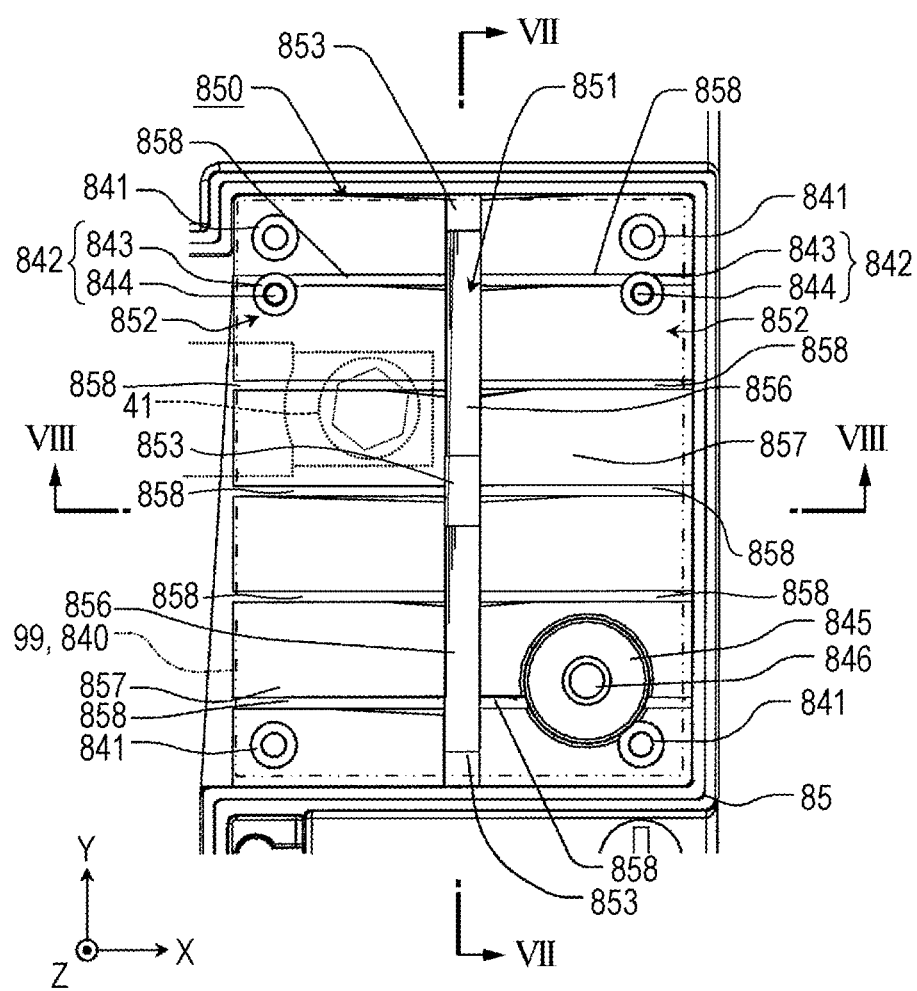
FIG. 6 is a top plan view showing a schematic configuration of a printed circuit board installation region.
Figure 7:
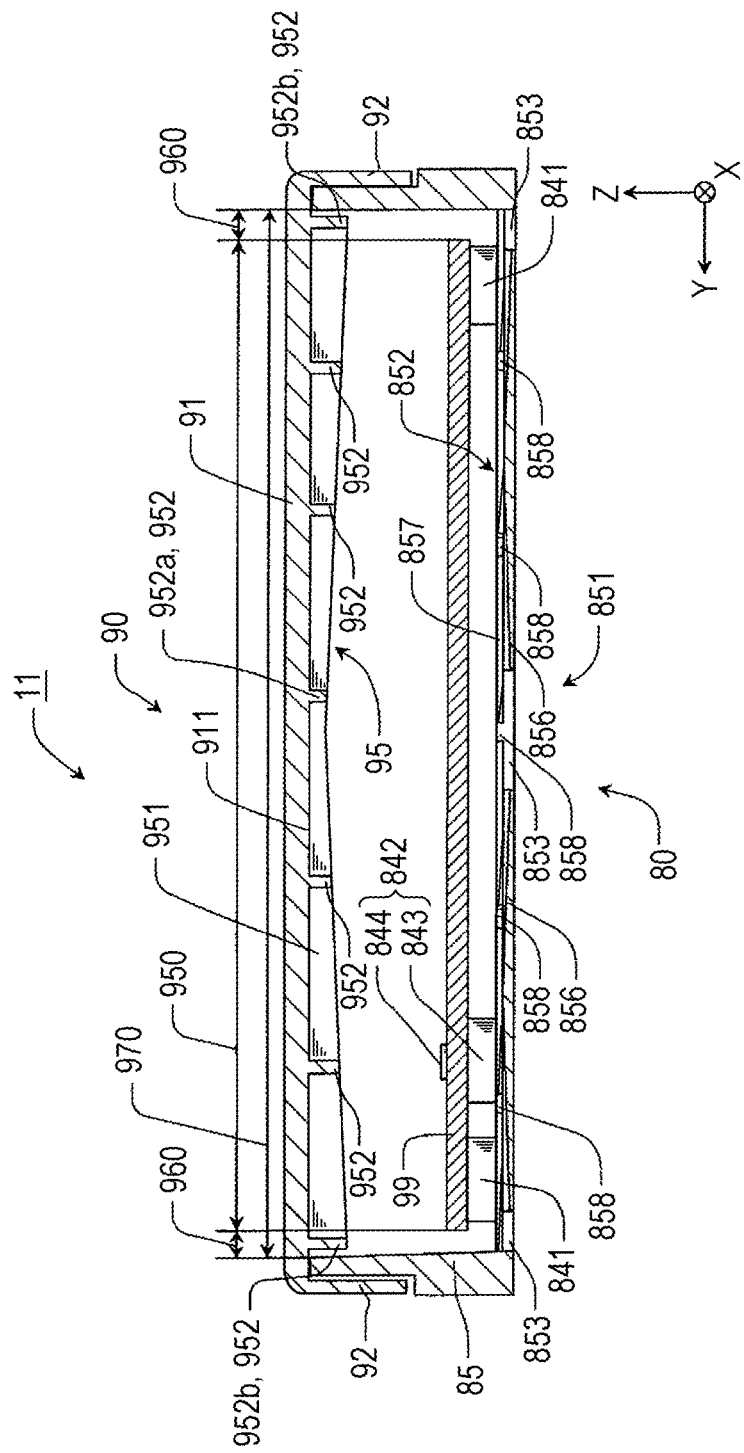
FIG. 7 is a cross-sectional view of the first outer covering taken along a YZ plane which includes a line VII-VII in FIG. 6.
Figure 8:
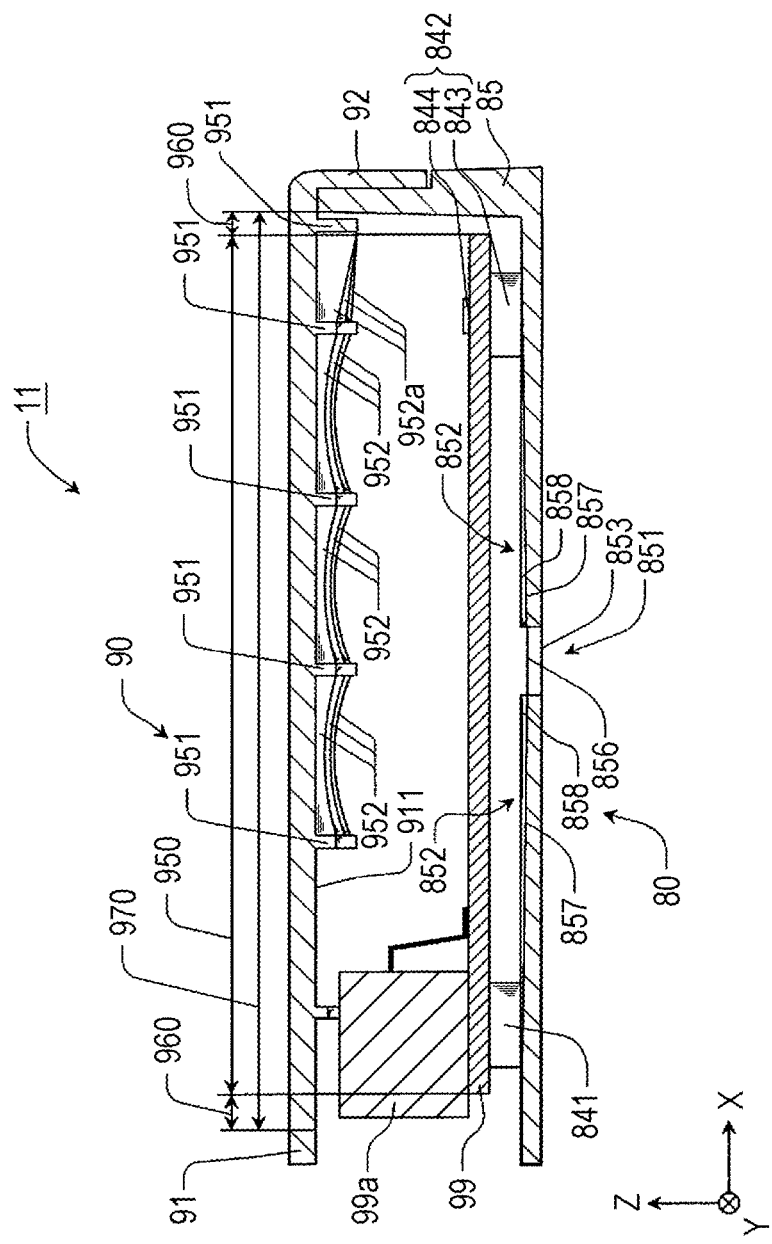
FIG. 8 is a cross-sectional view of the first outer covering taken along a ZX plane which includes a line VIII-VIII in FIG. 6.

FIG. 6 is a top plan view showing a schematic configuration of the circuit board installation region 840. FIG. 7 is a cross-sectional view of the first outer covering 11 taken along a YZ plane which includes a line VII-VII in FIG. 6. FIG. 8 is a cross-sectional view of the first outer covering 11 taken along a ZX plane which includes a line VIII-VIII in FIG. 6. In FIG. 6, an outer shape of the printed circuit board 99 is indicated by a double dashed chain line.

As shown in FIG. 6 to FIG. 8, the circuit board installation region 840 is a region covered by the printed circuit board 99, and is a wall surface disposed below the printed circuit board 99. The circuit board installation region 840 has, as viewed in a top plan view, substantially the same rectangular shape as the printed circuit board 99. On four corners of the circuit board installation region 840, a circuit board holding portion 841 for holding the printed circuit board 99 is formed respectively. Each circuit board holding portion 841 is formed of a cylindrical projection, and a threaded hole is formed in the circuit board holding portion 841.

Out of four circuit board holding portions 841, in the vicinity of two circuit board holding portions 841 disposed on a plus side in the Y axis direction, two positioning portions 842 for positioning the printed circuit board 99 are disposed. The positioning portion 842 is formed of a columnar-shaped body 843 which projects from the circuit board installation region 840; and a columnar-shaped positioning projection 844 which projects from an upper surface of the body 843. An upper surface of the body 843 of the positioning portion 842 and an upper surface of the circuit board holding portion 841 are made coplanar with each other so that the printed circuit board 99 mounted on the upper surfaces of the body 843 and the upper surface of the circuit board holding portion 841 can be held flatly. The upper surface of the body 843 of the positioning portion 842 and the upper surface of the circuit board holding portion 841 are positioned above the wall surface which forms the circuit board installation region 840 and hence, the printed circuit board 99 and the circuit board installation region 840 are disposed in a spaced-apart manner from each other. As shown in FIG. 4, in the printed circuit board 99, a through hole 991 which communicates with the threaded hole formed in the circuit board holding portion 841 is formed at four corners of the printed circuit board 99. By making screws threadedly engage with the threaded holes of the circuit board holding portion 841 through the through holes 991, the printed circuit board 99 is fixed in the circuit board installation region 840. Through holes 992 into which positioning projections 844 are inserted are formed in the printed circuit board 99. In mounting the printed circuit board 99 on the circuit board installation region 840, the printed circuit board 99 can be positioned on the XY plane by inserting the positioning projections 844 into the through holes 992.

As shown in FIG. 6, a screw mounting recessed portion 845 in which a fixing screw (not shown in the drawing) for fixing the heat insulating plate 700 is disposed is formed on the circuit board installation region 840. A through hole 846 is formed in a bottom surface of the screw mounting recessed portion 845, and a fixing screw is made to pass through the through hole 846 and is threadedly engaged with the threaded hole formed in the heat insulating plate 700.

As shown in FIG. 6 to FIG. 8, in the circuit board installation region 840, a drain passage 850 for discharging water to the outside of the region is formed. That is, the drain passage 850 is formed directly below the printed circuit board 99 in the vertical direction. The drain passage 850 includes a groove portion 851 and guide portions 852 which guide water to the groove portion 851.

The groove portion 851 is a drain groove for discharging water, and extends along the Y axis direction at the center portion of the circuit board installation region 840 in the X axis direction. A drain port 853 is formed in both end portions and a center portion of the groove portion 851 in an extending direction of the groove portion 851. The drain ports 853 are through holes which are formed in a penetrating manner in the vertical direction (Z axis direction), and discharge water which reaches the drain ports 853 to the outside of the circuit board installation region 840.

As shown in FIG. 6, the bus bar 41 (indicated by a broken line in FIG. 6) disposed below the first outer covering 11 is disposed at a position horizontally away from an area vertically below the drain port 853. With such a configuration, water discharged from the drain port 853 is suppressed from falling onto the bus bar 41. It is preferable that the conductive members other than the bus bar 41 be also disposed at positions horizontally away from the area vertically below the drain port 853. Since it is sufficient that water from the drain port 853 is prevented from falling onto the conductive member, it is sufficient that the conductive members are not disposed directly below the drain ports 853. When the conductive member is disposed vertically below the drain port 853, a member which interrupts water may be interposed between the drain port 853 and the conductive member.

As shown in FIG. 7, the bottom surface 856 of the groove portion 851 forms a first inclined surface which is gradually lowered as the bottom surface 856 extends toward the drain ports 853. The bottom surface 856 disposed between the drain port 853 on one end of the groove portion 851 and the drain port 853 at the center of the groove portion 851 and the bottom surface 856 disposed between the drain port 853 on the other end of the groove portion 851 and the drain port 853 at the center of the groove portion 851 have substantially the same shape. Accordingly, the description is made only with respect to the shape of one bottom surface 856.

One bottom surface 856 is inclined in a mountain-like shape with a center portion thereof in the extending direction formed as a boundary. Accordingly, it is possible to guide water accumulated in the groove portion 851 to both of the drain port 853 on one end portion side and the drain port 853 at the center portion.

The bottom surface 856 of the groove portion 851 may be formed into an inclined surface which is continuously inclined at the same angle as a whole. The bottom surface of the groove portion 851 may be formed into a curved surface. When a drainability is considered not so significant, the bottom surface 856 of the groove portion 851 may be formed of a horizontal surface.

As shown in FIG. 6 to FIG. 8, the pair of guide portions 852 is disposed to be opposite to each other with the groove portion 851 sandwiched therebetween in the X axis direction. Each of the pair of guide portions 852 has substantially the same shape and hence, in this embodiment, the description is made by exemplifying one guide portion 852, and with respect to the other guide portion 852, only portions which make the other guide portion 852 differ from one guide portion 852 are described later.

One guide portion 852 includes an inclined surface 857 (second inclined surface) which is lowered as the inclined surface 857 extends toward the groove portion 851, that is, toward the bottom surface 856 (first inclined surface). Although the inclined surface 857 is a flat surface inclined with respect to the X axis direction, the inclined surface 857 may be a curved surface. A plurality of draining ribs 858 are arranged in a row at intervals on the inclined surface 857 in the Y axis direction. The draining rib 858 is an elongated projection which extends along an inclination direction of the inclined surface 857 continuously from one end portion to the other end portion of the inclined surface 857 in the X axis direction. An upper surface of the draining rib 858 is parallel to the XY plane. A projection amount of the draining rib 858 from the inclined surface 857 is gradually increased as the draining rib 858 extends toward the groove portion 851.

A screw mounting recessed portion 845 is formed on the other guide portion 852. A peripheral edge of the screw mounting recessed portion 845 is raised more upward than the inclined surface 857. With such a configuration, water which flows on the inclined surface 857 minimally enters the screw mounting recessed portion 845.

A wall surface which forms the circuit board installation region 840 is formed of a hydrophobic surface. In forming the lid body 80 using the above-mentioned insulating resin material, by applying well-known hydrophobic treatment to the wall surface which forms the circuit board installation region 840, the wall surface is a hydrophobic surface. Surfaces of respective parts disposed on the circuit board installation region 840 may be formed into a hydrophobic surface respectively. Further, the whole surface of the covered portion 84 of the lid body 80 may be formed into a hydrophobic surface.

Next, the operation of the drain structure provided to the circuit board installation region 840 of the lid body 80 is described.

During the use of the energy storage apparatus 1, there may be a case where dew condensation occurs in the outer covering 10 because of difference in temperature between the inside and the outside of the outer covering 10. For example, assume that dew condensation occurs in the circuit board installation region 840 of the lid body 80. Condensed dew generated on the inclined surface 857 is gradually guided to the groove portion 851 due to the inclination of the inclined surface 857. At this stage of operation, the wall surface on which the circuit board installation region 840 is formed is a hydrophobic surface and hence, the condensed dew is smoothly guided to the groove portion 851.

There may be also a case where condensed dew generated in the vicinity of the draining rib 858 is brought into contact with the draining rib 858 so that the condensed dew is merged with other condensed dew to be liquid droplets. When condensed dews are merged to form liquid droplets, the own weight of merged condensed dews is increased. The draining rib 858 can also be a passage for guiding the liquid droplets to the groove portion 851. Accordingly, condensed dews can be more smoothly guided to the groove portion 851.

The condensed dew (water) guided to the groove portion 851 is guided to the respective drain ports 853 due to the inclination of the bottom surface 856 of the groove portion 851, and is discharged to the outside of the lid body 80 from the drain ports 853.

Next, the condensation countermeasure structure provided to the grid portion 95 of the cover body 90 is described.

As shown in FIG. 5, FIG. 7 and FIG. 8, the grid portion 95 includes a plurality of plate-like first wall bodies 951 which extend along the Y axis direction, and a plurality of plate-like second wall bodies 952 which extend in the X axis direction. The plurality of first wall bodies 951 and the plurality of second wall bodies 952 intersect with each other respectively and hence, the grid portion 95 has a grid array as viewed from the Z axis direction. In the grid portion 95 having such a configuration, the condensation countermeasure structure is applied to portions of the grid portion 95 which are disposed in the facing region 950 and the outer region 960 of the top plate portion 91 respectively.

The facing region 950 is a region which faces the circuit board installation region 840 as viewed in a plan view, that is, a region which faces the printed circuit board 99. The outer region 960 is an annular region which surrounds the facing region 950 as viewed in a plan view and is disposed adjacently to the facing region 950. A region obtained by combining the outer region 960 and the facing region 950 is referred to as a condensation countermeasure region 970.

In regions other than the condensation countermeasure region 970 in the grid portion 95, the first wall bodies 951 and the second wall bodies 952 are formed substantially at the same height as a whole. However, in such regions other than the condensation countermeasure region 970, there are portions where the height of the wall bodies is not fixed partially. The mounting positions and the heights of the first wall bodies 951 and the second wall bodies 952 are decided by a height of an article (for example, electric equipment or the like) to be housed in the first outer covering 11.

As shown in FIG. 7, the plurality of first wall bodies 951 in the condensation countermeasure region 970 are projecting portions each of which projects toward the printed circuit board 99 side (a minus side in the Z axis direction) from the upper wall surface 911, and are formed continuously in an elongated manner in the Y axis direction along the upper wall surface 911. The plurality of first wall bodies 951 in the condensation countermeasure region 970 are arranged in a row at predetermined intervals in the X axis direction. The plurality of first wall bodies 951 in the condensation countermeasure region 970 form first inclined portions each of which becomes highest at a center portion thereof in the Y axis direction so that the first inclined portion is away from the printed circuit board 99, and is gradually lowered as the first inclined portion extends toward an edge of the condensation countermeasure region 970 so that the first inclined portion approaches the printed circuit board 99. In the first wall body 951 which forms the first inclined portion, a projection amount from the upper wall surface 911 becomes minimum at the center portion thereof in the Y axis direction, and is gradually increased as the first wall portion 951 extends toward the edge of the condensation countermeasure region 970. A lower end surface of the first wall body 951 which forms the first inclined portion is a flat surface which is inclined such that the lower end surface is gradually lowered as the first wall body 951 extends from the center portion thereof to the edge of the facing region 950. As described above, the first wall body 951 which forms the first inclined portion is formed continuously from the facing region 950 to the outer regions 960, and an outer region 960 side of the first wall body 951 is lower than the facing region 950 side of the first wall body 951.

In this embodiment, the case is exemplified where the lower end surface of the first wall body 951 which forms the first inclined portion is a flat surface. However, the lower end surface may be a curved surface.

As shown in FIG. 7 and FIG. 8, the plurality of second wall bodies 952 in the condensation countermeasure region 970 are projecting portions each of which projects toward the printed circuit board 99 side (a minus side in the Z axis direction) from the upper wall surface 911, and extend in the X axis direction along the upper wall surface 911. The plurality of second wall bodies 952 in the condensation countermeasure region 970 are disposed between the plurality of first wall bodies 951, and are arranged in a row at predetermined intervals in the Y axis direction. The plurality of second wall bodies 952 in the condensation countermeasure region 970 form the second inclined portions each of which is gradually lowered as the second inclined portion extends toward the first inclined portions. A lower end surface of the second wall body 952 which forms the second inclined portion is a curved surface which becomes highest at the center portion thereof in the X axis direction so that the second wall body 952 is away from the printed circuit board 99 at the center portion thereof between the first wall bodies 951 adjacent to each other, and is gradually lowered as the lower end surface extends toward the first wall bodies 951 so that the second wall body 952 approaches the printed circuit board 99. The lower end surface of the second wall body 952 which forms the second inclined portion is a concave curved surface which is recessed upward. With respect to the second wall body 952 which forms the second inclined portion, a projection amount from the upper wall surface 911 becomes minimum at a center portion of the second wall body 952 between the first wall bodies 951 adjacent to each other, and is gradually increased as the second wall body 952 extends toward the first wall body 951.

The case is exemplified where the lower end surface of the second wall body 952 is a concave surface, the lower end surface may be an inclined flat surface. In this embodiment, however, a lower end surface of a second wall body 952a disposed on the most plus side in the X axis direction is a flat inclined surface which is gradually lowered as the lower end surface extends from one first wall body 951 which is disposed on a minus side in the X axis direction out of the first wall bodies 951 adjacent to each other to the other first wall body 951.

The plurality of second wall bodies 952 are formed to have a height (projection amount) which corresponds to a height (projection amount) of the corresponding first wall bodies 951 respectively. That is, a lower end surface of the second wall body 952 which is disposed at a higher portion of the first wall bodies 951 is disposed at a higher position, and a lower end surface of the second wall body 952 which is disposed at a lower portion of the first wall bodies 951 is disposed at a lower position. To describe the above-mentioned configuration in more detail with reference to FIG. 7, a lower end surface of the second wall body 952a which corresponds to a highest portion of the first wall body 951 is higher than the lower end surfaces of other second wall bodies 952. On the other hand, a lower end surface of a second wall body 952b which corresponds to a lowest portion of the first wall body 951 is lower than the lower end surfaces of other second wall bodies 952.

The upper wall surface 911 which forms the condensation countermeasure region 970 is a hydrophilic surface. In forming the cover body 90 using the above-mentioned insulating resin material, by applying well-known hydrophilic treatment to the upper wall surface 911 which forms the condensation countermeasure region 970, the upper wall surface 911 is a hydrophilic surface. Surfaces of respective parts disposed on the upper wall surface 911 which form the condensation countermeasure regions 970 may be formed into a hydrophilic surface respectively. The whole lower surface of the cover body 90 including the grid portion 95 may be formed into a hydrophilic surface.

Next, the operation of the condensation countermeasure structure provided to the condensation countermeasure region 970 of the cover body 90 is described.

During the use of the energy storage apparatus 1, there may be a case where dew condensation occurs in the outer covering 10 because of difference in temperature between the inside and the outside of the outer covering 10. For example, assume that dew condensation occurs in the condensation countermeasure region 970 of the cover body 90. Condensed dew generated on the upper wall surface 911 reaches the second wall bodies 952 and the first wall bodies 951. Further, condensed dew generated on the second wall bodies 952 which form the second inclined portions and condensed dew which reaches the second wall bodies 952 from the upper wall surface 911 are guided to the first wall bodies 951 due to the inclination of the lower end surfaces of the second wall bodies 952. Condensed dew generated on the first wall bodies 951 and condensed dew which reaches the first wall bodies 951 from the second wall bodies 952 or the upper wall surface 911 are gradually guided to the outer region 960 due to the inclination of the lower end surfaces of the first wall bodies 951 which form the first inclined portions and fall. In this embodiment, the outer region 960 horizontally projects from the printed circuit board 99 over the whole circumference and hence, it is possible to suppress the fallen condensed dew from being brought into contact with the printed circuit board 99. The fallen condensed dew is discharged to the outside of the lid body 80 from the drain ports 853 by the drain structure of the lid body 80.

As has been described above, in the energy storage apparatus 1 according to the embodiment of the present invention, in the circuit board installation region 840 on the wall surface below the printed circuit board 99, the drain passage 850 for discharging condensed dew to the outside of the circuit board installation region 840 is formed and hence, it is possible to suppress the condensed dew from accumulating in the circuit board installation region 840. Accordingly, it is possible to suppress short-circuiting of the printed circuit board 99 caused by the condensed dew.

The bottom surface 856 of the drain passage 850 is the first inclined surface which is gradually lowered as the first inclined surface extends toward the drain port 853 and hence, drain water can be guided to the drain ports 853 with certainty.

The bus bar 41 is disposed at the position away from the area vertically below the drain port 853 in the horizontal direction and hence, drain water can be prevented from falling on the bus bar 41. Accordingly, it is possible to prevent short-circuiting of the energy storage apparatus 1 per se caused by drain water.

The inclined surface 857 (second inclined surface) which is lowered as the inclined surface 857 extends toward the bottom surface 856 of the drain passage 850 is formed in the circuit board installation region 840 which faces the printed circuit board 99. Accordingly, the dew condensation generated in the circuit board installation region 840 can be guided to the groove portion 851 by the inclined surface 857.

The draining ribs 858 each of which is elongated along the inclination direction are formed on the inclined surface 857 and hence, the condensed dew can be easily collected as liquid droplets and, at the same time, the liquid droplets can be guided to the groove portion 851 of the drain passage 850 by the draining ribs 858.

In this embodiment, the description is made by exemplifying the case where the draining ribs 858 which project from the inclined surface 857 are formed on the inclined surface 857. However, a groove portion which is elongated along the inclination direction may be formed on the inclined surface 857 in place of forming the draining ribs 858. Also in this case, it is possible to acquire advantageous effect substantially equal to the advantageous effects as which the draining ribs 858 can acquire.

The printed circuit board 99 is disposed in a spaced-apart manner from the wall surface which forms the circuit board installation region 840 and hence, it is possible to prevent the printed circuit board 99 from being brought into contact with the condensed dew generated on the circuit board installation region 840.

The wall surface which forms the circuit board installation region 840 is a hydrophobic surface and hence, it is possible to accelerate the flow of condensed dew generated on the wall surface.

The first wall bodies 951 which form the first inclined portions are formed on the region of the upper wall surface 911 of the outer covering 11 which covers the printed circuit board 99 and hence, it is possible to guide the condensed dew to a desired position using the first wall bodies 951 as a guide. Accordingly, it is possible to suppress falling of condensed dew onto the printed circuit board 99 and hence, short-circuiting of the printed circuit board 99 can be suppressed.

The first wall bodies 951 which form the first inclined portions are continuously formed to the outer region 960 and hence, it is possible to guide the condensed dew to the outside of the printed circuit board 99. Accordingly, it is possible to suppress falling of condensed dew onto the printed circuit board 99 more effectively.

The first wall bodies 951 which form the first inclined portions are formed of the elongated projecting portions. Accordingly, compared to a case where the upper wall surface is simply inclined, condensed dew is minimally fallen and hence, condensed dew can be easily merged as liquid droplets.

The plurality of first wall bodies 951 which form the first inclined portions are disposed at intervals. Accordingly, the condensed dew can be guided in a wide range.

There are provided the second inclined portions (second wall bodies 952) which are gradually lowered as the second inclined portions extend toward the first wall bodies 951 which form the first inclined portions. Accordingly, the condensed dew can be guided to the first wall bodies 951 by the second wall bodies 952 whereby the condensed dew can be easily guided to the first wall bodies 951.

The upper wall surface 911 is a hydrophilic surface and hence, it is possible to suppress falling of the condensed dew generated on the upper wall surface 911.

(Modification 1)

Next, a modification 1 of the above-mentioned embodiment is described. In the above-mentioned embodiment, the case is described where, in the grid portion 95, the first wall bodies 951 in the condensation countermeasure region 970 form the first inclined portions. However, the first inclined portion may have any shape as long as the first inclined portion is gradually lowered as the first inclined portion extends toward the edge of the condensation countermeasure region 970.

Hereinafter, a case where the first inclined portion is a flat surface is described with reference to FIG. 9 and FIG. 10. In the description made hereinafter, parts identical with the parts of the above-mentioned embodiment are given the same symbols and their repeated description is omitted.

Figure 9:
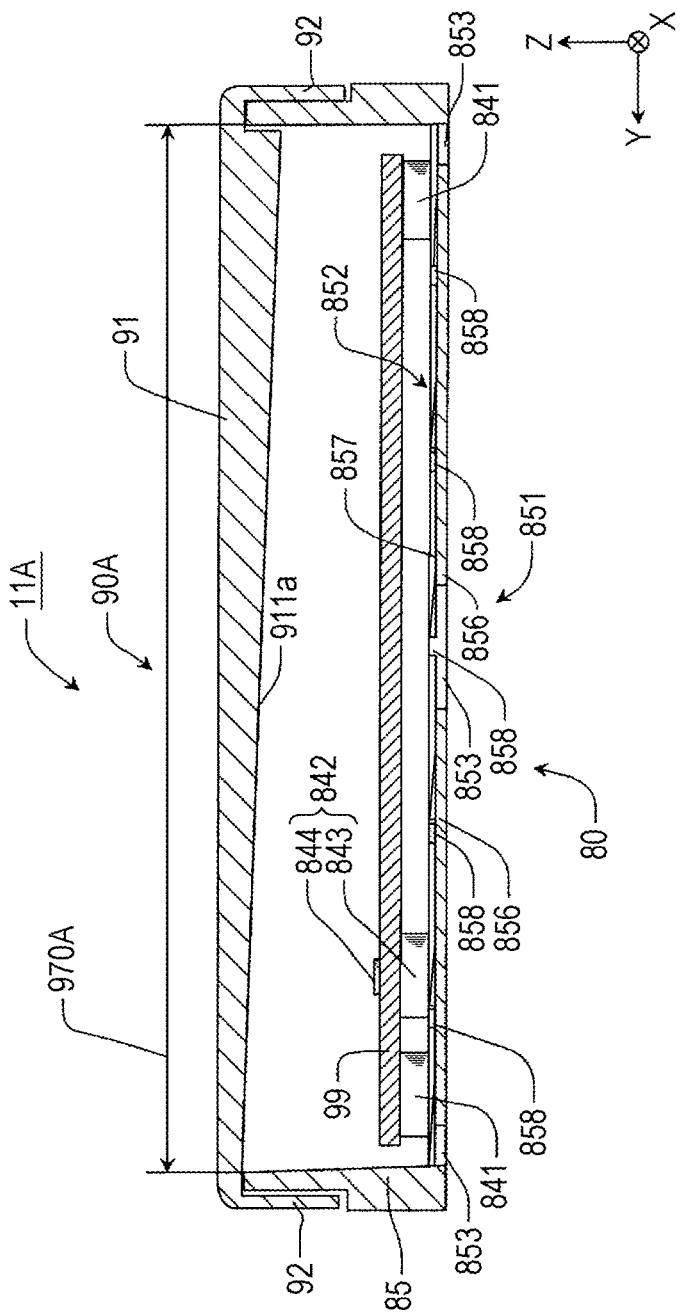
FIG. 9 is a cross-sectional view of a first outer covering according to a modification 1.

FIG. 9 is a cross-sectional view of a first outer covering 11A according to the modification 1, and is a view which corresponds to FIG. 7. FIG. 10 is a cross-sectional view of the first outer covering 11A according to the modification 1, and is a view which corresponds to FIG. 8.

As shown in FIG. 9 and FIG. 10, an upper wall surface 911a which forms a condensation countermeasure region 970A of a cover body 90A of the first outer covering 11A is an inclined surface as a whole. That is, the upper wall surface 911a forms a first inclined portion which is gradually lowered as the upper wall surface 911a extends toward an edge of the condensation countermeasure region 970A. To be more specific, the upper wall surface 911a has an inclination gradually lowered toward a minus side in the Y axis direction as viewed in a direction shown in FIG. 7, and has an inclination gradually lowered toward a plus side in the X axis direction as viewed in a direction shown in FIG. 8.

As described above, the upper wall surface 911a which is an inclined surface forms the first inclined portion and hence, it is possible to guide condensed dew to a desired position with the simple configuration.

The first inclined portion may not be formed of the inclined surface which forms the whole upper wall surface 911a but may be formed of an inclined surface formed by inclining at least a portion of the upper wall surface. The first inclined portion may be a curved surface.

Although the energy storage apparatuses according to the embodiment of the present invention and the modifications of the embodiment have been described heretofore, the present invention is not limited to the above-mentioned embodiment and the modification of the embodiment. The embodiment and the modification of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention. The configurations which are made by arbitrarily combining the respective constitutional elements which the above-mentioned embodiment and the modification of the embodiment include are also included in the scope of the present invention.

For example, in the above-mentioned embodiment and the modification of the embodiment, the case has been exemplified where the drain structure is applied to the circuit board installation region 840 of the lid body 80. However, the drain structure may be applied to a region of the lid body 80 other than the circuit board installation region 840 or to the whole lid body 80. Particularly, from a viewpoint of suppressing short-circuiting, it is preferable to apply the drain structure to a region where electric equipment other than the printed circuit board 99 is mounted.

In the above-mentioned embodiment and the modification of the embodiment, the case has been exemplified where the condensation countermeasure structure is applied to the condensation countermeasure region 970 of the cover body 90. However, the condensation countermeasure structure may be applied to a region of the cover body 90 other than the condensation countermeasure region 970 or to the whole grid portion 95 of the cover body 90. Particularly, from a viewpoint of suppressing short-circuiting, it is preferable to apply the condensation countermeasure structure to a region which covers electric equipment other than the printed circuit board 99.

In the above-mentioned embodiment and the modification of the embodiment, the case has been described where the drain structure and the condensation countermeasure structure are applied to the printed circuit board 99 which is one of electric equipment. However, at least one of the drain structure and the condensation countermeasure structure may be also applied to other electric equipment such as a relay incorporated in the outer covering 10.

In the above-mentioned embodiment, the first outer covering 11 is exemplified as the housing part for housing the printed circuit board 99 therein. However, the housing part is not limited to the first outer covering 11 as long as the housing part can house the printed circuit board 99 in the outer covering 11. For example, in a case where a dedicated casing for housing the printed circuit board 99 therein is disposed in the outer covering 11, the casing may be used as the housing part.

The present invention is applicable to an energy storage apparatus provided with energy storage devices and an outer covering.

What is claimed is:
1. An energy storage apparatus, comprising:
   an energy storage device;
   an outer covering; and
   an electric equipment disposed in the outer covering,
   wherein the outer covering includes:
      a housing part which houses the electric equipment, the housing part being sealed; and
      a drain passage which is disposed in a region covered by the electric equipment and through the drain passage water is discharged to outside of the region, the drain passage being located on a lower wall surface below the electric equipment in the housing part,
   wherein the drain passage includes a first inclined surface which is gradually lowered as the drain passage extends toward a drain port of the drain passage, and
   wherein a conductive member is disposed at a position away from an area vertically below the drain port in a horizontal direction.

2. The energy storage apparatus according to claim 1, wherein a second inclined surface, which is lowered as the second inclined surface extends toward the first inclined surface, is formed in the region.

3. The energy storage apparatus according to claim 2, wherein a projecting portion, or a groove portion that is elongated along an inclination direction, is formed on the second inclined surface.

4. The energy storage apparatus according to claim 1, wherein the electric equipment is disposed in a spaced-apart manner from the lower wall surface.

5. The energy storage apparatus according to claim 1, wherein the lower wall surface includes a hydrophobic surface.

6. The energy storage apparatus according to claim 1, wherein the outer covering includes:
   a first outer covering, the first outer covering forming a lid body; and a second outer covering, the second outer covering forming a body, and
wherein the first outer covering includes the housing part.

7. The energy storage apparatus according to claim 6, wherein the first outer covering further includes:
a cover body, the cover body covering a portion of the lid body, and
wherein the housing part is partitioned by the lid body and the cover body.

8. The energy storage apparatus according to claim 7, wherein the cover body includes an upper wall surface which partitions the housing part, and faces the electric equipment, and
wherein a first inclined portion, which is disposed in a region which covers the electric equipment and is disposed closer to the electric equipment as the first inclined portion approaches an edge of the region, is formed on the upper wall surface.

9. The energy storage apparatus according to claim 8, wherein the upper wall surface includes a hydrophilic surface.

10. The energy storage apparatus according to claim 1, wherein the lower wall surface includes a hydrophobic surface, and the upper wall surface disposed on a side opposite to the lower wall surface with respect to the electric equipment has a hydrophilic surface.

11. The energy storage apparatus according to claim 1, wherein the lower wall surface includes a lower inclined surface which is lowered as the lower inclined surface extends to a center of the region, and an upper wall surface, disposed on a side opposite to the lower wall surface with respect to the electric equipment, includes an upper inclined surface where a height of the upper inclined surface is increased as the upper inclined surface extends toward the center of the region.

12. The energy storage apparatus according to claim 1, wherein the drain passage is overlapped with the electric equipment in a plan view of the electric equipment.

13. The energy storage apparatus according to claim 12, wherein the drain passage opens toward a lower surface of the electric equipment.

14. An energy storage apparatus, comprising:
an energy storage device;
an outer covering; and
an electric equipment disposed in the outer covering;
wherein the outer covering includes:
a housing part which houses the electric equipment the housing part being sealed; and
a drain passage which is disposed in a region covered by the electric equipment and through the drain passage water is discharged to outside of the region, the drain passage in located on a lower wall surface below the electric equipment in the housing part, and
wherein the housing part is watertight sealed.

15. An energy storage apparatus, comprising:
an energy storage device;
an outer covering; and
an electric equipment disposed in the outer covering,
wherein the outer covering includes:
a housing part which houses the electric equipment, the housing part being sealed; and
a drain passage which is disposed in a region covered by the electric equipment and through the drain passage water is discharged to outside of the region, the drain passage being located on a lower wall surface below the electric equipment in the housing part,
wherein the outer covering further includes:
a lid body which covers the energy storage device; and
a cover body which covers a portion of the lid body,
wherein the electric equipment is disposed on the lid body and is covered by the cover body, and
wherein the lid body includes the drain passage opening toward a lower surface of the electric equipment.

16. The energy storage apparatus according to claim 15, wherein the drain passage includes a first inclined surface which is lowered as the drain passage extends toward a drain port of the drain passage, and
wherein the drain port is positioned within the region covered by the electric equipment in a plan view of the electric equipment.

17. The energy storage apparatus according to claim 16, wherein a second inclined surface, which is lowered as the second inclined surface extends toward the first inclined surface, is formed in the region.

* * * * *